United States Patent
Buchsteiner

(10) Patent No.: US 6,886,972 B2
(45) Date of Patent: May 3, 2005

(54) FOOD PROCESSOR COMPRISING A SIFTER DEVICE

(75) Inventor: Alois Buchsteiner, Klagenfurt (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 93 days.

(21) Appl. No.: 10/281,785

(22) Filed: Oct. 28, 2002

(65) Prior Publication Data

US 2003/0081498 A1 May 1, 2003

(30) Foreign Application Priority Data

Oct. 31, 2001 (EP) .............................................. 01890302

(51) Int. Cl.[7] .......................... A47J 43/044; A47J 43/22
(52) U.S. Cl. ................ 366/154.2; 366/183.2; 366/200; 209/365.1
(58) Field of Search ................. 209/274–278, 209/334, 365.1, 365.2; 366/150.1, 154.2, 183.2, 200, 301, 118, 123, 128

(56) References Cited

U.S. PATENT DOCUMENTS

| | | | | |
|---|---|---|---|---|
| 6,891 A | * | 1/1849 | Fitch ....................... | 209/365.1 |
| 617,486 A | * | 1/1899 | Holt ......................... | 209/365.2 |
| 1,434,618 A | * | 11/1922 | Lauterbur ................. | 366/141 |
| 1,620,865 A | * | 3/1927 | Blackden ................. | 209/287 |
| 1,937,385 A | * | 11/1933 | Hinkle ..................... | 209/235 |
| 2,074,162 A | * | 3/1937 | Bowman .................. | 209/251 |
| 2,509,557 A | * | 5/1950 | Braatz ...................... | 366/111 |
| 2,537,852 A | * | 1/1951 | Peterson ................... | 209/355 |
| 2,710,098 A | | 6/1955 | Tilton ....................... | 209/358 |
| 4,598,874 A | | 7/1986 | Barnett .................... | 241/37.5 |
| 6,659,633 B2 | * | 12/2003 | Ancona et al. ........... | 366/129 |
| 6,669,359 B1 | * | 12/2003 | Ancona et al. ........... | 366/197 |

FOREIGN PATENT DOCUMENTS

FR    1082587 A    12/1954

* cited by examiner

Primary Examiner—David Sorkin

(57) ABSTRACT

In a food processor (1) with a drivable apparatus part (17) provided for interacting with a material which is to be processed and with driving means (9) for driving the drivable apparatus part (17), said driving means (9) comprising at least one driving part (11,12,13,14,15), either a driving part (11,12,13,14,15) of the driving means (9) or the drivable apparatus part (17) is used for driving a sifter device (27).

4 Claims, 4 Drawing Sheets

FOOD PROCESSOR COMPRISING A SIFTER DEVICE

The invention relates to a food processor with at least one drivable apparatus part provided so as to interact with a material to be processed, such as a stirring unit or a kneading device or a mixing bowl, and with driving means for driving the apparatus part, said driving means comprising a motor and at least one transmission part provided between the motor and the apparatus part, and a sifter device which can be driven by the motor.

Such a food processor is known from Patent Document U.S. Pat. No. 2,710,098. With the known food processor, a separate additional transmission device is provided for driving the sifter device or for driving the stirring tool contained in the sifter device, which is provided in addition to the main transmission part provided between the motor of the food processor and a mixing tool of the food processor. The provision of such an additional transmission device represents a considerable expenditure and leads to a relatively great constructional height and size of such a food processor as well as to an increase in the price of such a food processor.

It is an object of the invention to avoid the situation described above and to provide an improved food processor. To achieve this object, features according to the invention are provided in a food processor according to the invention such that a food processor according to the invention can be characterized as follows:

A food processor with at least one drivable apparatus part provided so as to interact with a material to be processed, which apparatus part forms part of the food processor, and with driving means for driving the at least one drivable apparatus part, said driving means comprising a motor and at least one transmission part between the motor and the at least one drivable apparatus part, which transmission part also forms part of the food processor, and with a sifter device capable of being driven by the motor, wherein from the at least one transmission part and the at least one apparatus part at least one of these parts of the food processor being provided and designed for driving the sifter device.

The features according to the invention render it possible to provide a reliable drive for the sifter device of a food processor according to the invention in a constructionally very simple and space-saving manner and with very little extra effort and expenditure. The substantial advantage is achieved here that driving of the sifter device is achieved with means which are present in the food processor anyway, so that absolutely no additional components are required for driving a sifter device in the most favorable case.

With a food processor according to the invention, it has proved to be advantageous if, in addition, the features wherein a rotating drivable food processing tool being provided as rotating drivable apparatus part, and wherein the food processing tool being provided with at least one driving means for the driving sifter device, and wherein the sifter device is provided with a counter-driving element for interacting with the driving means of the food processing tool, are provided. Such a solution has proved advantageous in respect of the simplest possible constructional realization and a reliable drive of the sifter device.

With a food processor according to the invention as described in the preceding paragraph, it has proved to be particularly advantageous if, in addition, the features wherein the food processing tool has a drive shaft, and the driving means of the food processing tool being formed by a disk mounted on the drive shalt, which disk is designed to create a reciprocating motion of the sifter device and with which disk a driving arm projecting from the sifter device interacts, said driving arm forming the counter-driving means of the sifter device, are provided. This achieves the situation in which the sifter device of a food processor according to the invention can be given different operational movements and vibratory movements in a simple manner, and specifically in that the disk mounted on the drive shaft of the food processing tool has different design shapes.

In connection with the foregoing, it has proved particularly advantageous if the disk is formed by an eccentric disk. Such an eccentric disk may be circular, but also ellipsoidal. It may, however, also have a different shape. Mention may further be made of the fact that such a disk mounted on the drive shaft of a food processing tool may also take the form of a circular disk and may be arranged coaxially with the drive shaft of the food processor, and may feature within its circumference range at least one cam-shaped projection which is provided for driving a driving arm of the sifter device.

With a food processor according to the invention, however, it has also proved to be of advantage if the features wherein a rotating drivable food container being provided as rotating drivable apparatus part and wherein the food container being provided with driving means for driving the sifter device, and wherein the sifter device being provided with a counter-driving meant for interacting with the driving means of the food container, are additionally provided. Such a solution also provides the advantage that, if desired, a plurality of different operational movements or vibratory movements for the sifter device can be realized in a simple manner.

With a food processor as described in the preceding paragraph, it has proved to be particularly advantageous if, in addition, the features wherein the driving means of the food container being formed by a driving gear of the food container, by means of which the food container can be rotatably driven, and wherein the sifter device has a driving arm provider for interacting with the driving gear, said driving arm forming the counter-driving means of the sifter device are provided. Such a solution provides the advantage that no separate driving means are required on the food container for driving the sifter device.

With a food processor according to the invention, it has further proved to be advantageous if the sifter device being designed to be removable from the food processor. Such a solution provides the advantage in particular that the sifter device can be cleaned simply and thoroughly.

These and other aspects of the invention are apparent from and will be elucidated with reference to the embodiments described hereinafter.

The invention will be described in further detail with reference to three embodiments shown in the drawings, but the invention is not restricted to these.

Figure 1:
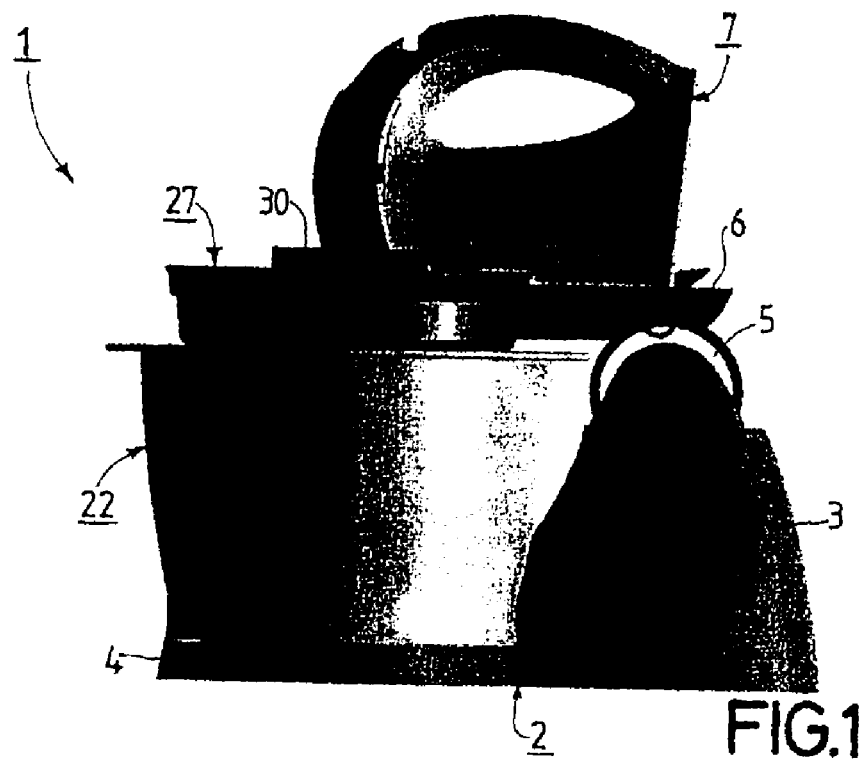
FIG. 1 shows, in a first side elevation, a food processor in a first embodiment of the invention.
Figure 2:
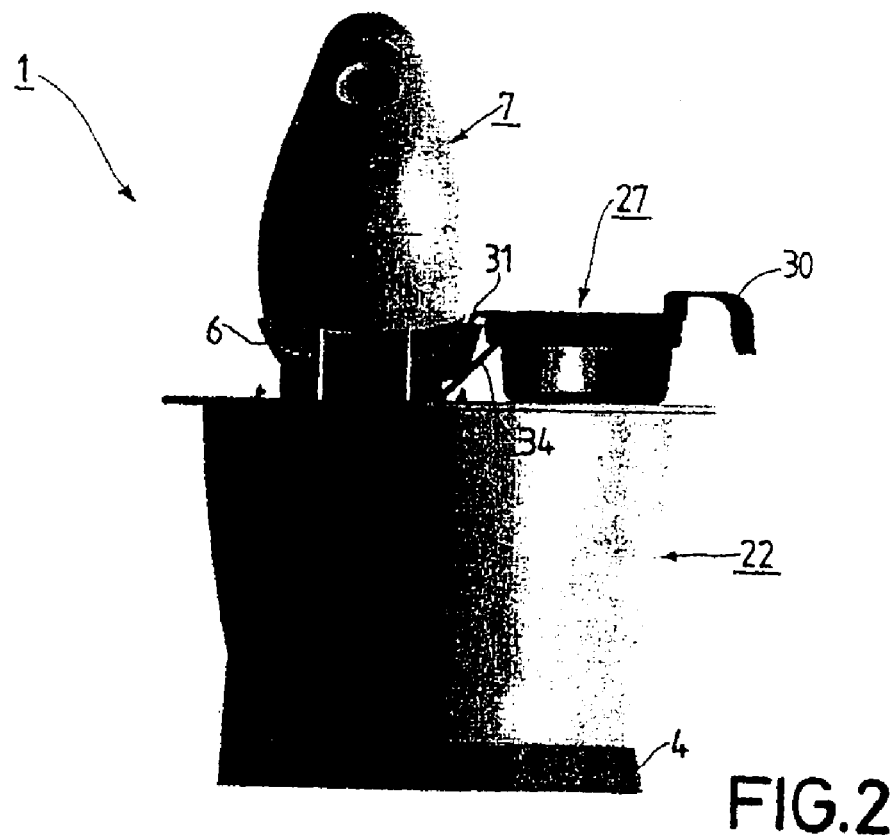
FIG. 2 is a second side elevation showing the food processor of FIG. 1.
Figure 3:
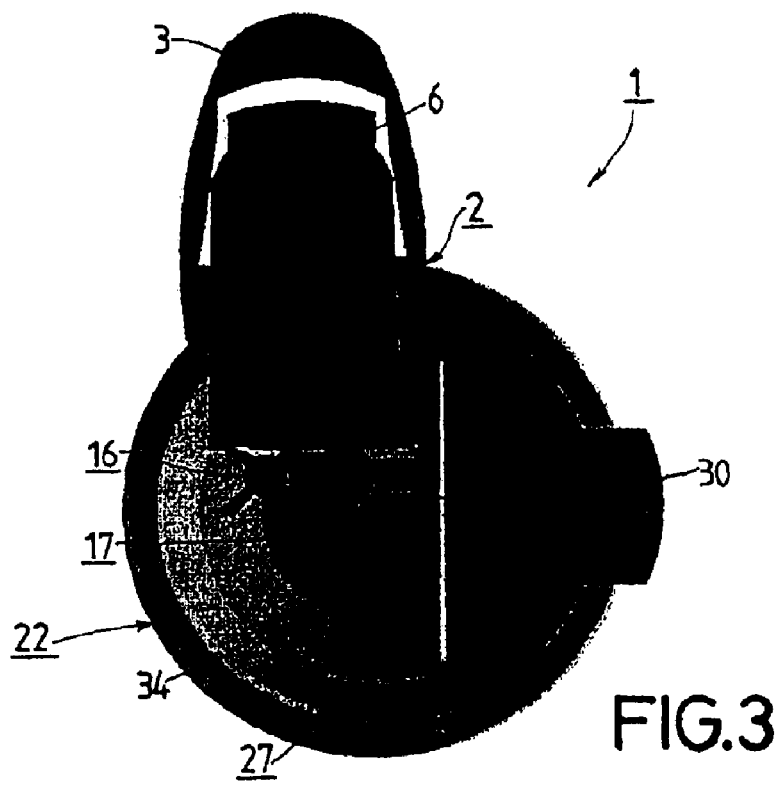
FIG. 3 is a plan view of part of the food processor according to claims 1 and 2.
Figure 4:
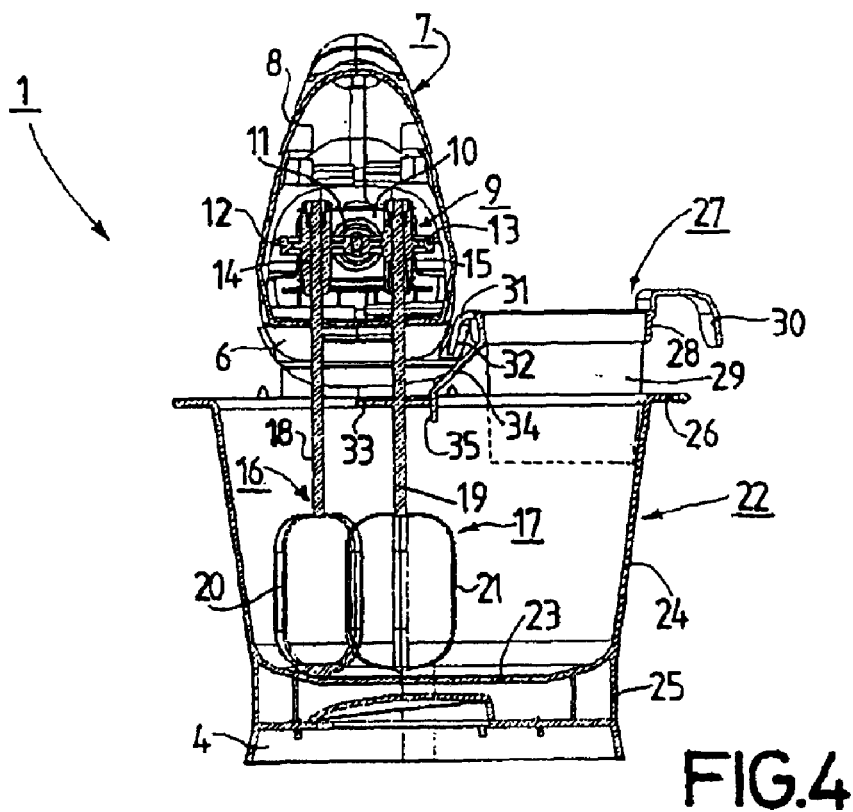
FIG. 4 is a cross-sectional view of the food processor according to claims 1 and 3.

FIGS. 1 to 4 show a food processor 1. The food processor 1 consists of a base part 2, which on the one hand consists of a tower-shaped part 3 and a plate-shaped part 4. A cup-shaped retaining part 6 is connected to the tower-shaped part 3 by means of a pivot connection 5. The retaining part 6 is intended to accommodate a so-termed hand mixer 7, which therefore forms a constituent part of the food processor 1. The hand mixer 7 can be placed into the cup-shaped retaining part 6 and can be secured to the cup-shaped retaining part 6, a principle which has long been known per se.

The hand mixer 7 features a housing 8. Provided in the housing 8 are driving means, as can be seen from FIG. 4. The driving means 9 comprising a motor 10 by which a driving worm 11 can be driven. Two worm wheels 12 and 13 engage with the driving worm 11. Connected to each worm wheel 12 and 13 is a respective driving sleeve 14 and 15.

The driving means 9 described above are provided for driving two rotating drivable apparatus parts 16 and 17 which are capable of being driven into rotation. Said two apparatus parts 16 and 17 are stirring and mixing tools which are provided for interacting with a material to be processed. The two apparatus parts 16 and 17 each form part of the food processor. Likewise, the driving parts of the driving means 9, i.e. the driving worm 11, the two worm wheels 12 and 13, and the two driving sleeves 14 and 15 also each form part of the food processor. The two rotating drivable apparatus parts 16 and 17, which are rotating drivable food processing tools, each have a respective driving shaft 18 and 19 and a respective bar 20 and 21 connected to the respective driving shaft 18 and 19, by means of which the material under treatment, i.e. a foodstuff, can be processed.

The food processor 1 further comprises a food container 22 which can be set on the plate-shaped part 4 of the base part 2. In the present case, the food container 22 remains stationary. The food container 22 consists essentially of a base wall 23 and a circumferential wall 24 projecting from the base wall 23 and merging in its area adjacent to the base wall 23 into an annular support wall 25 with which the food container 22 can be placed on the plate-shaped part 4. In its area remote from the base wall 23, the circumferential wall 24 merges into a container edge 26.

The food processor 1 of FIGS. 1 to 4 further comprises a sifter device 27. The sifter device 27 can be driven by the motor 10. The sifter device 27 consists of a frame 28 and a screen 29 connected to the frame. The sifter device 27 has a handle 30 with which the sifter device 27 can be easily manipulated. The sifter device 27 is provided with a hook 31 by means of which the sifter device 27 can be hooked into a section 32 of the cup-shaped retaining part 6. This achieves that the sifter device 27 can be removed from the food processor 1.

With the food processor 1 of FIGS. 1 to 4, the second rotating drivable apparatus part 17 is provided with driving means 33 for the sifter device 27. In addition, the sifter device 27 is provided with counter-driving means 34, said counter-driving means 34 being provided to interact with the driving means 33 of the second apparatus part 17. In this situation, the driving means 33 are formed by a disk 33 located on the driving shaft 19 of the second apparatus part 17, said disk 33 being designed to create a reciprocating movement of the sifter device 27. The disk 33 is an eccentric disk 33 of circular shape here and is arranged eccentrically in relation to the driving shaft 19.

The counter-driving means 34 of the sifter device 27 being formed by a driving arm 34 extending from the sifter device 27, i.e. from the frame 28 of the sifter device 27. The driving arm 34 in this case is designed to run obliquely to the frame 28 and has a free end 35 running parallel to the driving shaft 19, said free end interacting with the eccentric disk 33.

The eccentric disk 33 and the driving arm 34 can set the sifter device 27 into a reciprocating, i.e. vibratory motion, as a result of which the material contained in the screen 29, for example flour or sugar or the like, is subjected to a vibratory or shaking motion, so that the material contained in the sifter device 27 can be sifted into the food container 22 when the food processor 1 is set into operation, i.e. when the motor 10 is switched on.

Figure 5:
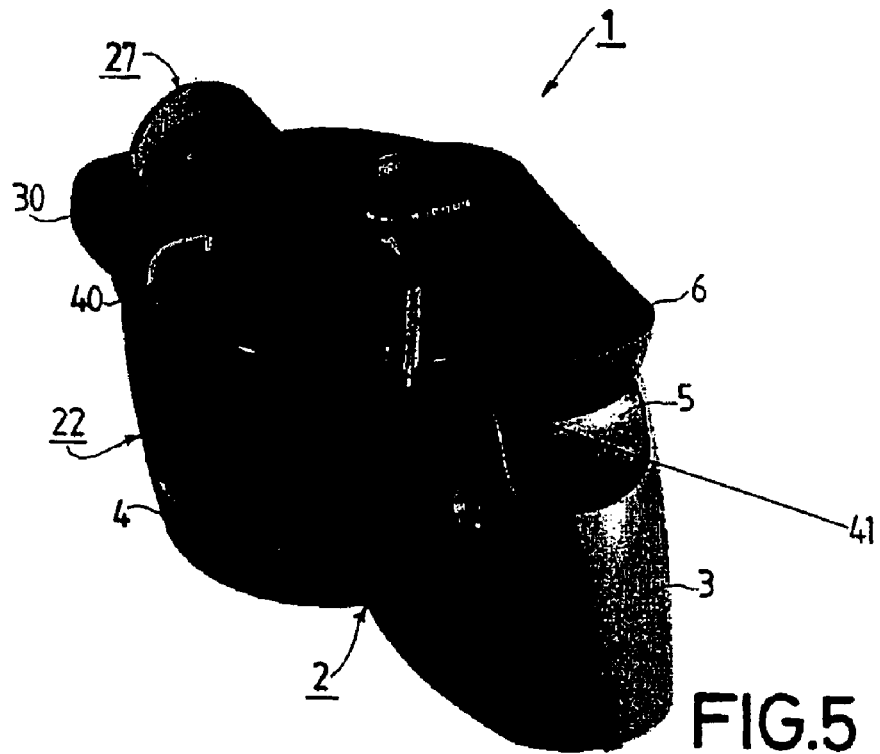
FIG. 5 is an oblique view from above of part of the food processor in a second embodiment of the invention.
Figure 6:
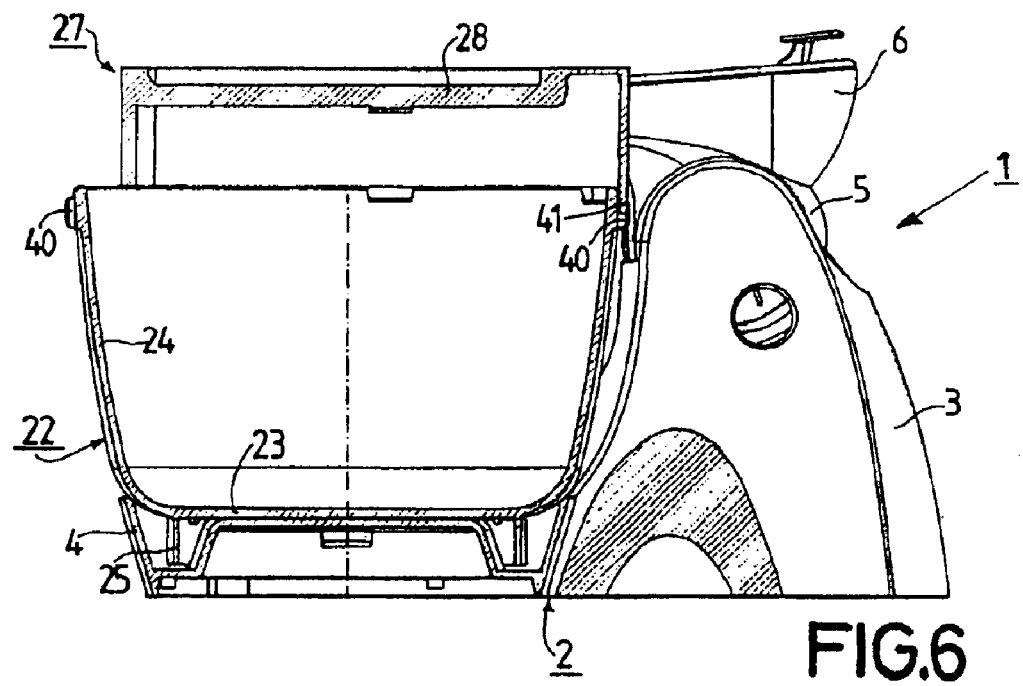
FIG. 6 is a cross-sectional view of the part shown in FIG. 5 of the food processor of FIG. 5.

FIGS. 5 and 6 show a further food processor 1 according to the invention. The food processor 1 of FIGS. 5 and 6 is substantially different from the food processor 1 of FIGS. 1 to 4, specifically in that the foodstuff container 22 of the food processor 1 of FIGS. 5 and 6 is rotatably mounted on the plate-shaped part 4, and that the food container 22 is rotatably driven, i.e. forms a rotatably-driven tool for interacting with a material to be processed. The drive of the rotatably mounted food container 22 is realized with the food processor 1 of FIGS. 5 and 6 such that an intermediate transmission element is provided in the cup-shaped retaining part 6, which element can be driven by the driving means of a hand mixer which can be placed in the cup-shaped retaining part 6, said intermediate transmission element not being shown in FIGS. 5 and 6. This intermediate transmission element forms part of the driving means of the food processor 1. Such a design has long been known. The intermediate transmission element contained in the cup-shaped retaining part 6 comprises a toothed drive wheel projecting from the cup-shaped retaining part 6 at the base side and engaging with a driving gear 40 provided on the food container 22.

In the food processor 1 of FIGS. 5 and 6, the food container 22 is provided with driving means 40 for the sifter device 27, and, specifically, the driving means 40 for the food container 22 is formed by the driving gear 40 by which the food container 22 can be driven into rotation.

The sifter device 27 is provided with a counter-driving means 41 for interacting with the driving gear 40, and the sifter device 27 here has a driving arm 41 designed to interact with the driving gear 40 and projecting from the frame 28 of the sifter device 27 in the direction of the plate-shaped part 4.

The pin-shaped driving arm 41 and the driving gear 40 generate a vibratory motion when the food processor 1 is switched on and consequently the motor of the hand mixer (not shown in FIGS. 5 and 6) is operating, as a result of which a material contained in the sifter device 27 is subjected to a sifting process and the sifted material accordingly passes into the food container 22.

Figure 7:
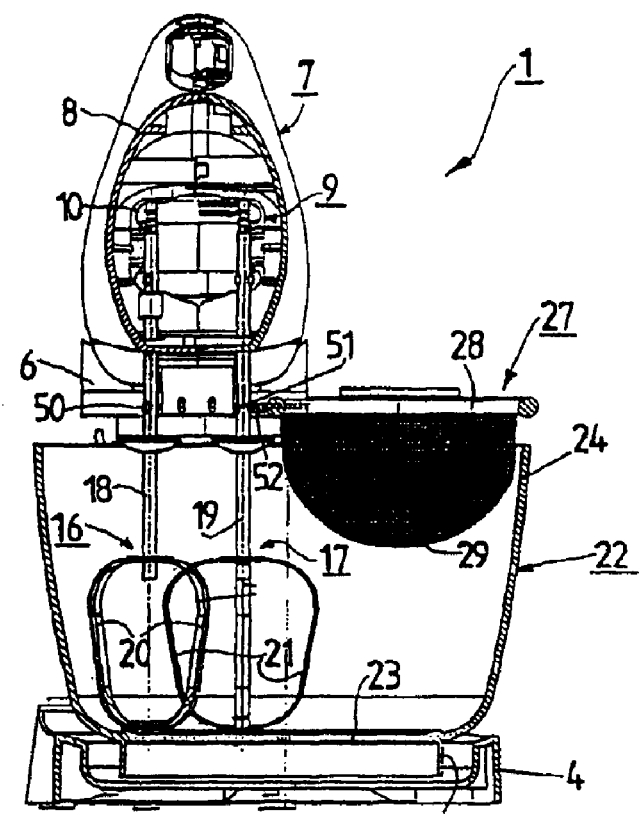
FIG. 7 shows, in an analogous manner to FIG. 4, a food processor in a third embodiment of the invention.
Figure 8:
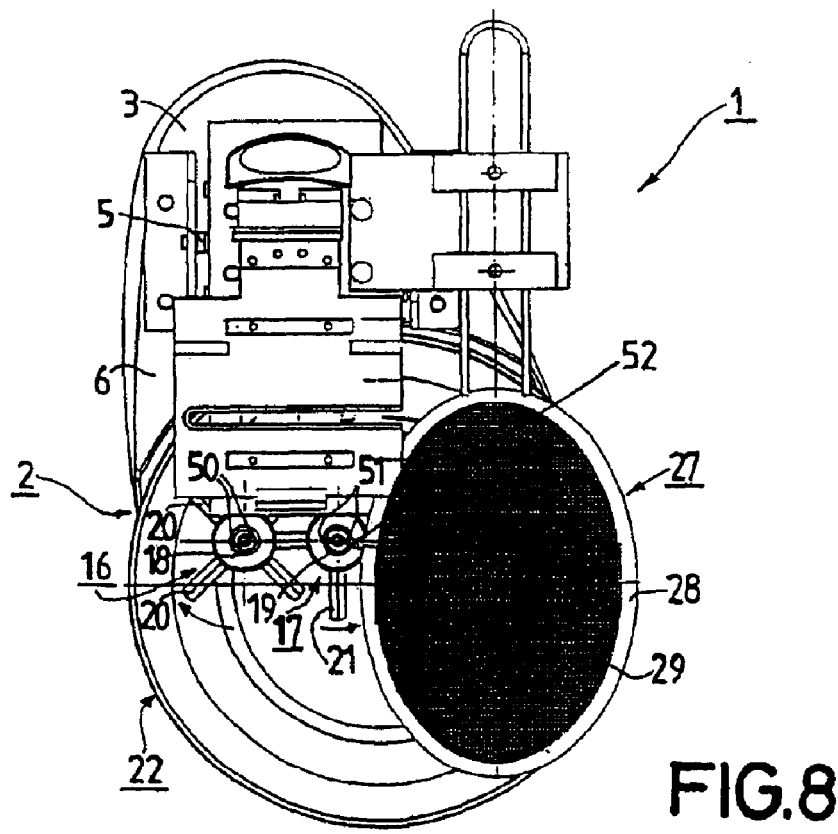
FIG. 8 shows part of the food processor of FIG. 7 in plan view.

FIGS. 7 and 8 show a further food processor 1 which has a design similar to the design of the food processor 1 of FIGS. 1 to 4. The food processor of FIGS. 7 and 8 have a design in which the sifter device 27 being drivable by the second rotating drivable apparatus part 19. With the food processor 1 of FIGS. 7 and 8, the two rotating drivable apparatus parts 16 and 17 each have two pinched tags 50 and 51 in the area of their driving shafts 18 and 19. The two pinched tags 51 on the driving shaft 19 of the second rotating drivable apparatus parts 17 are used for driving the sifter device 27 in the food processor 1 of FIGS. 7 and 8. The two pinched tags 51 accordingly form driving means 51 for driving the sifter device 27. In this case, the sifter device 27 has a pin 52, projecting sideways from the frame 28 of the sifter device 27, said pin 52 here forming the counter-driving means 52 of the sifter device 27, and said pin 52 projecting with its free end into the movement path of the two pinched tags 51. The result of this is that, when the two rotating drivable apparatus parts 16 and 17 are driven a vibratory or impacting drive of the sifter device 27 is effected by the two pinched tags 51 of the second rotating drivable apparatus part 17.

In the food processors 1 described above, the drive of the individual sifter device 27 is effected in each case by a rotary driven tool, said rotary driven tool being provided so as to interact with a material which is to be processed. According to the invention, however, other embodiments are also possible, which are not reproduced here in drawings. Such an embodiment is described below.

In a modification of the food processor of FIGS. 5 and 6, with an intermediate transmission element in the cup-shaped retaining part 6, an embodiment may alternatively be realized in which a drivable transmission part of the intermediate transmission element, still contained in the cup-shaped retaining part 6, is additionally used for driving a sifter device. In this case, the drive of the sifter device is not effected by a drivable tool provided for interacting with a material to be processed, but by a transmission element of the food processor provided for driving such a tool. In this case the advantage is also obtained that no separate driving means are required for driving the sifter device of the food processor, but that it is possible for the sifter device to be driven with a transmission element of the driving means which is present anyway.

What is claimed is:

1. A food processor comprising:
   a sifter, the sifter having a counter-driving means; and
   a drivable apparatus part, the drivable apparatus part having a driving means;
   wherein the counter-driving means is in free contact with and unconnected to the driving means to produce a vibratory motion in the sifter,
   the counter-driving means is a driving arm having a free end;
   the drivable apparatus part is a food container; and
   the driving means is a driving gear disposed on the food container;
   wherein the free end freely contacts the driving gear.

2. A food processor (1) comprising:
   at least one drivable apparatus part (17,22), the drivable apparatus part being provided so as to interact with a material to be processed, the drivable apparatus part forming part of the food processor,
   a driver (9) for driving the at least one drivable apparatus part (17,22), said driver (9) comprising a motor (10) and at least one transmission part (11,12,13,14,15) provided between the motor (10) and the at least one drivable apparatus part (17,22), the transmission part also forming part of the food processor,
   the food processor further comprising a sifter device (27) capable of being driven by the motor (10),
   wherein, from the at least one transmission part (11,12, 13,14,15) and the at least one apparatus part (17,22), at least one of said parts of the food processor (11,12,13, 14,15,17,22) is provided and designed for driving the sifter device (27),
   wherein the sifter device (27) has a free end, the free end freely contacting the at least one of the transmission part (11,12,13,14,15) and the apparatus part (17,22) provided and designed for driving the sifter device (27),
   the at least one drivable apparatus part (17, 22) being a rotating drivable food container,
   the food container (22) being provided with driving means (40) for driving the sifter device (27), and
   the sifter device (27) being further provided with the counter-driving means (41) for interacting with the driving means (40) of the food container (22).

3. A food processor (1) as claimed in claim 2, the driving means (40) of the food container (22) being formed by a driving gear (40) of the food container (22), by means of the driving gear (40) the food container (22) being rotatably drivable, and the sifter device (27) having a driving arm (41) interactable with the driving gear (40), said driving arm (41) forming the counter-driving means (41) of the sifter device (27).

4. A food processor (1) as claimed in claim 2, the sifter device (27) being removable from the food processor (1).

* * * * *